(12) United States Patent
Ishiguro et al.

(10) Patent No.: US 7,958,921 B2
(45) Date of Patent: Jun. 14, 2011

(54) PNEUMATIC TIRE WITH TREAD HAVING SUB GROOVES IN BLOCKS, CENTER MAIN GROOVE AND SUBSIDIARY MAIN GROOVES

(75) Inventors: Sadayuki Ishiguro, Hiratsuka (JP); Kenichirou Endou, Minato-ku (JP)

(73) Assignee: The Yokohama Rubber Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 12/724,694

(22) Filed: Mar. 16, 2010

(65) Prior Publication Data

US 2011/0073230 A1 Mar. 31, 2011

(51) Int. Cl.
*B60C 11/11* (2006.01)
(52) U.S. Cl. ......... 152/209.18; 152/209.27; 152/209.28; 152/DIG. 3
(58) Field of Classification Search ............. 152/209.18, 152/209.27, 209.28, DIG. 3; D12/563–567
See application file for complete search history.

(56) References Cited

U.S. PATENT DOCUMENTS

| | | | | |
|---|---|---|---|---|
| 4,456,046 A | * | 6/1984 | Miller | 152/209.28 |
| 4,667,717 A | * | 5/1987 | Graas | 152/209.28 |
| 4,884,607 A | * | 12/1989 | Mori | 152/209.28 |
| 5,327,952 A | * | 7/1994 | Glover et al. | 152/209.28 |
| D390,175 S | * | 2/1998 | Ball et al. | D12/567 |
| D405,730 S | * | 2/1999 | Maxwell | D12/566 |
| 6,378,583 B1 | * | 4/2002 | Fontaine | 152/209.28 |
| 2007/0215258 A1 | * | 9/2007 | Fukunaga | 152/209.18 |

FOREIGN PATENT DOCUMENTS

| | | |
|---|---|---|
| EP | 0172974 | 3/1986 |
| EP | 0475929 | 3/1992 |
| EP | 0609195 | 8/1994 |
| EP | 0893283 | 1/1999 |
| JP | 03-082610 | 4/1991 |
| JP | 09-018811 | 1/1997 |
| JP | 11-091317 | * 4/1999 |
| JP | 2003-146020 | 5/2003 |
| JP | 2004-306906 | 11/2004 |
| JP | 2007-186053 | * 7/2007 |
| JP | 2007-238060 | 9/2007 |
| WO | WO 2010/005057 | 1/2010 |

OTHER PUBLICATIONS

Machine translation for Japan 2007-186053 (no date).*
Machine translation for Japan 11-091317 (no.date).*

* cited by examiner

*Primary Examiner* — Steven D Maki
(74) *Attorney, Agent, or Firm* — Thorpe North & Western LLP

(57) ABSTRACT

A pneumatic tire having a designated rotational direction is disclosed, wherein an entire area having a width 85% of a total tire width and a center area having a width 30% of the total tire width are defined in a tread portion. A center main groove is positioned on a tire equatorial line and extends in a tire circumferential direction. Subsidiary main grooves are positioned on two sides of the center main groove and extend in the tire circumferential direction. Angled and lateral grooves extend at an angle, in a direction opposite the rotational direction towards an outside in the tire width direction. Lateral grooves extend from each subsidiary main groove. Sub grooves extend from the lateral grooves towards the rotational direction. A total length of a block edge in the center area is from 40% to 60% of a total length of a block edge in the entire area.

20 Claims, 7 Drawing Sheets

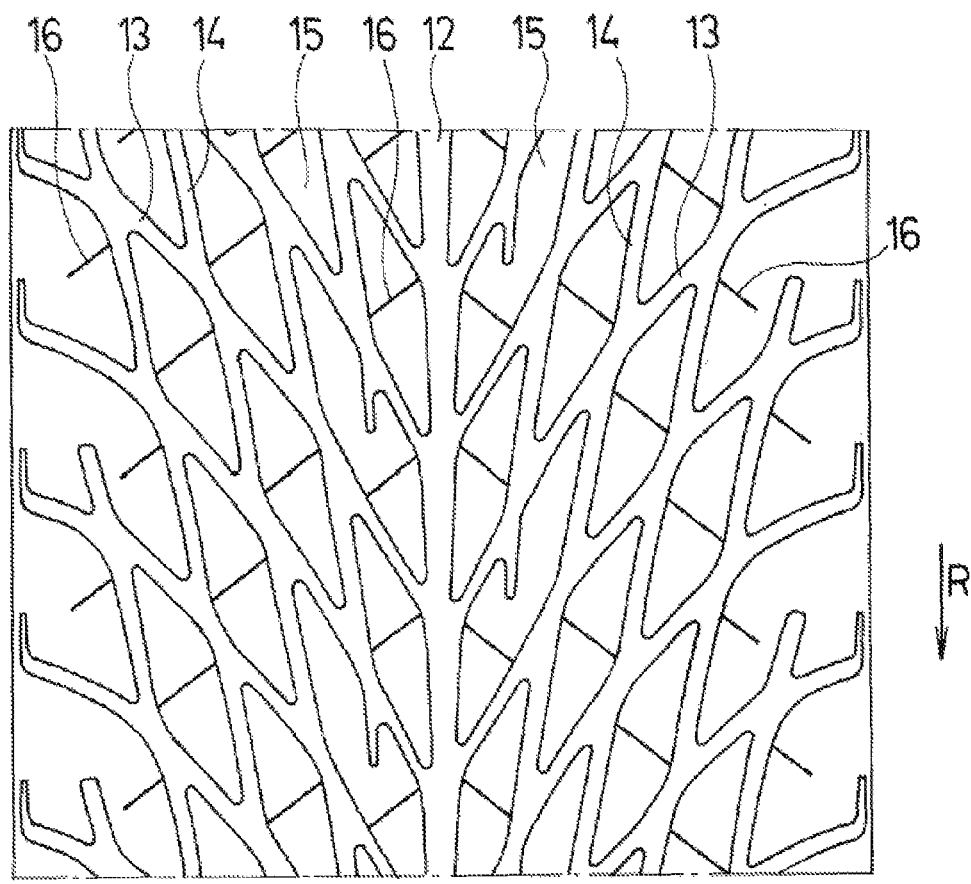
FIG. 7
(Conventional)

PNEUMATIC TIRE WITH TREAD HAVING SUB GROOVES IN BLOCKS, CENTER MAIN GROOVE AND SUBSIDIARY MAIN GROOVES

PRIORITY CLAIM

This application is based upon and claims the benefit of priority from Japanese Patent Application No. 2009-63085, filed Mar. 16, 2009, the entire contents of which are incorporated herein by reference.

TECHNICAL FIELD

The present invention relates to a pneumatic tire suitable as a racing tire, and in particular relates to a pneumatic tire that can improve running performance on a wet road surface when traveling straight and when cornering.

BACKGROUND ART

Tires provided with a plurality of main grooves extending in a tire circumferential direction in a tread portion are normally used as wet tires for racing. It is recognized that superior running performance of such tires on wet road surfaces are exhibited based on a drainage capability of the main grooves. However, in high speed races, an amount of water pushed ahead increases since water cannot be drained by the main grooves in tires having a tread pattern with main grooves extending in the tire circumferential direction as a main constituent, which results in an occurrence of a hydroplaning phenomenon. Also, in races with Gran Turismo (GT) touring cars having tire housings, there is an adverse effect whereby water remains in tire housings when tires having a tread pattern with main grooves extending in the tire circumferential direction as the main constituent are used. Thus, a groove arrangement that can drain water on road surfaces in a tire lateral direction is required.

As a wet tire for racing meeting such a demand, a tire is provided including, in the tread portion, a main groove that is in a tread center position and that extends in the tire circumferential direction, a plurality of first angled grooves that is in communication with the main groove and that extends at an angle, in a direction opposite a rotational direction, from the tread center position towards each shoulder side, and a plurality of second angled grooves that is not in communication with the main groove and that extends at an angle, in the same direction as the respective first angled grooves, while intersecting at least three of the first angled grooves, wherein a plurality of blocks is partitioned by the main groove and the angled grooves (for example, see Japanese Patent Publication (A) No. 2007-238060).

However, when the tread portion is partitioned into a plurality of blocks by the main groove and the angled grooves as disclosed above, a rigidity of the tread portion deteriorates. Since a large load is applied to tires when braking and when cornering in racing, there is a problem that a necessary braking performance and cornering performance on wet road surfaces cannot be exhibited when the rigidity of the tread portion is insufficient.

SUMMARY OF THE INVENTION

The pneumatic tire of the present invention achieving the aforementioned object is a pneumatic tire having a designated rotational direction, wherein, when an entire area having a width 85% of a total tire width and a center area having a width 30% of the total tire width are defined in a tread portion, a center main groove that is positioned on a tire equatorial line and that extends in a tire circumferential direction and subsidiary main grooves that are positioned on each side of the center main groove and extend in the tire circumferential direction, are provided in the center area; a plurality of angled grooves that extend at an angle, in a direction opposite the rotational direction, towards an outside in the tire width direction are provided between the center main groove and each subsidiary main groove; a plurality of lateral grooves that extend at an angle, in a direction opposite the rotational direction, from each subsidiary main groove towards the outside in the tire width direction are provided; a plurality of sub grooves extending from the lateral grooves towards the rotational direction are provided in each block partitioned between the lateral grooves; an end on leading sides of the sub grooves is closed; and a total length of a block edge in the center area is from 40% to 60% of a total length of a block edge in the entire area.

EFFECT OF THE INVENTION

According to the present invention, a center main groove and subsidiary main grooves extending in the tire circumferential direction are provided in the center area of the tread portion, while a plurality of angled grooves and a plurality of lateral grooves are provided extending at an angle in a direction opposite the rotational direction towards the outside in the tire width direction, and furthermore, a plurality of sub grooves extending from each lateral groove towards the rotational direction is provided. Therefore, when traveling on a wet road surface, water on the road surface is drained towards the tire width direction and thus the amount of water pushed back forwards can be reduced. It is thus possible to guarantee sufficient hydroplaning prevention performance when traveling straight. Also, in races with GT touring cars having tire housings, water can be prevented from remaining in the tire housings.

Furthermore, there is a tendency for suitable running performance to be easily exhibited on wet road surfaces for a tire wherein the center area of the tread portion has a contact pressure (surface pressure) of a certain degree even when the load applied to the tire fluctuates. By making the number of grooves in the center area relatively large, a road surface contact pressure per unit area increases, thus making improvement in running performance on wet road surfaces possible. However, increasing an area of the grooves alone leads to a deterioration of block rigidity in the center area, and since desired running performance cannot thus be achieved, the total length of the block edge in the center area is defined as disclosed above. It is thus possible to improve running performance on wet road surfaces effectively.

Also, since the end on the leading side of the sub grooves formed in each block between the lateral grooves is closed, and the blocks on the shoulder sides are not further divided by these sub grooves, sufficient rigidity of the tread portion can be guaranteed. It is therefore possible to achieve superior braking performance and turning performance on wet road surfaces. Running performance on wet road surfaces when traveling straight and when cornering can thus be improved beyond that which was conventionally possible.

In the present invention, the lateral grooves are preferably curved so that the inclination angle to the tire circumferential direction increases towards the outside in the width direction. Drainage performance based on the lateral grooves can thus be improved.

Preferably, the width of each sub groove is 3 mm or more and the length in the tire circumferential direction of each sub groove is 50% or more of the length in the tire circumferential direction of each corresponding block. Also, the inclination angle of each sub groove to the tire circumferential direction is preferably 15° or less. Drainage performance based on the sub grooves can thus be improved.

A distance W2 between the terminal center position of the leading side of adjacent sub grooves in the tire width direction with respect to a distance W1 between the center position of the subsidiary main grooves and the terminal center position of the leading side of the sub groove positioned nearest on a tire equatorial line side in the tire width direction preferably satisfies the relationship $0.85 \leq W2/W1 \leq 1.15$. By thus disposing the sub grooves at approximately equal distances, water on a road surface can be drawn effectively into the sub grooves. Each of the above-mentioned distances is a distance measured in the tire width direction along the tire tread surface.

Preferably, sipes extending along the angled grooves from the subsidiary main grooves are provided in each block partitioned between the angled grooves and an end on the tire equatorial line side of the sipes is closed. The width of the sipes is 2 mm or less. Such sipes contribute to increasing the total length of the block edge in the center area. Also, since the end on the tire equatorial line side of the sipes is closed, it is possible to suppress deterioration of block rigidity in the center area.

In the present invention, the total tire width is measured with a tire mounted on a specified rim, inflated to a specified air pressure, and with no load applied thereon. That is, for general use tires, the total tire width measured according to methods for measuring tire dimensions of specifications upon which tires are based is the standard normally imposed. Tires for racing follow racing specifications. For example, when a tire size (nominal cross-sectional width/nominal outer diameter R nominal rim diameter) is 280/710R18, a rim size (nominal rim diameter×nominal rim width) is 18×11 and an air pressure is 190 kPa. Similarly, when the tire size is 280/680R18, the rim size is 18×11 and the air pressure is 190 kPa, and when the tire is 280/650R18, the rim size is 18×11 and the air pressure is 190 kPa.

BRIEF DESCRIPTION OF THE DRAWINGS

FIG. 7 is a development view showing the tread pattern of the pneumatic tire of the conventional example.

BEST MODE FOR CARRYING OUT THE INVENTION

Figure 1:
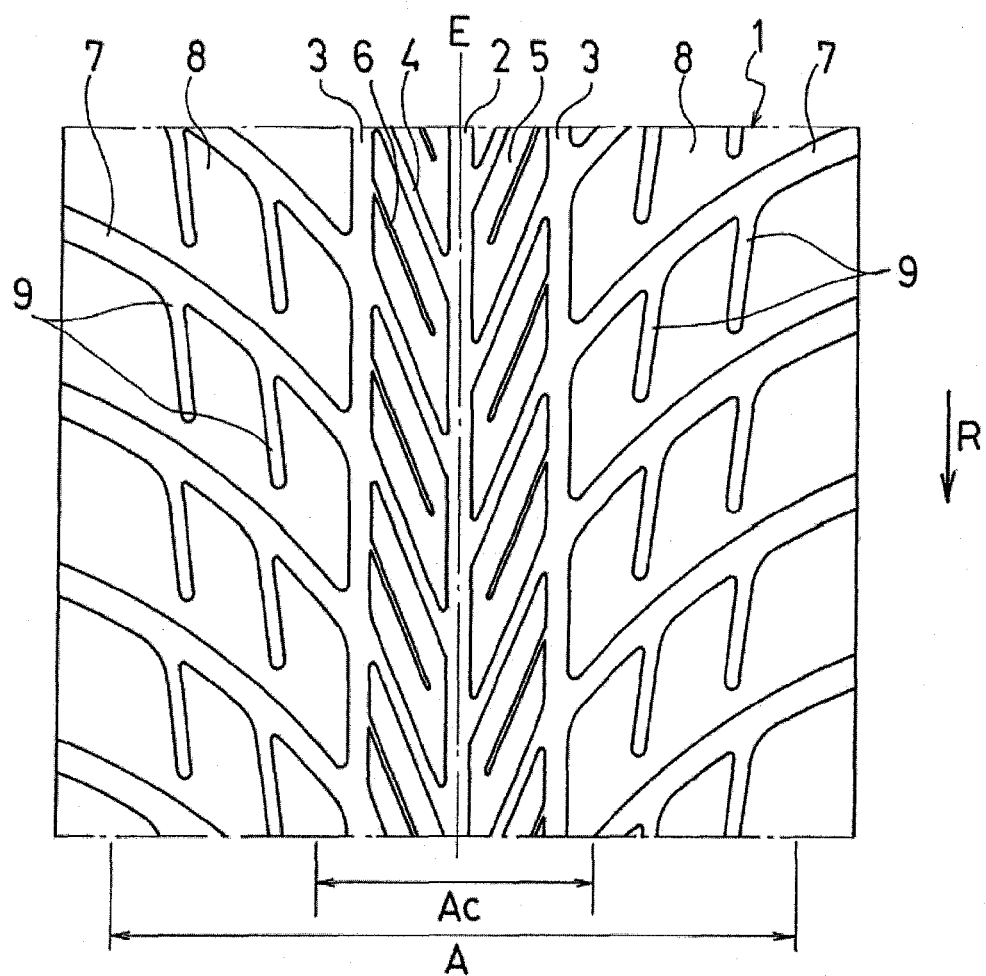
FIG. 1 is a development view showing the tread pattern of a pneumatic tire according to an embodiment of the present invention.
Figure 2:
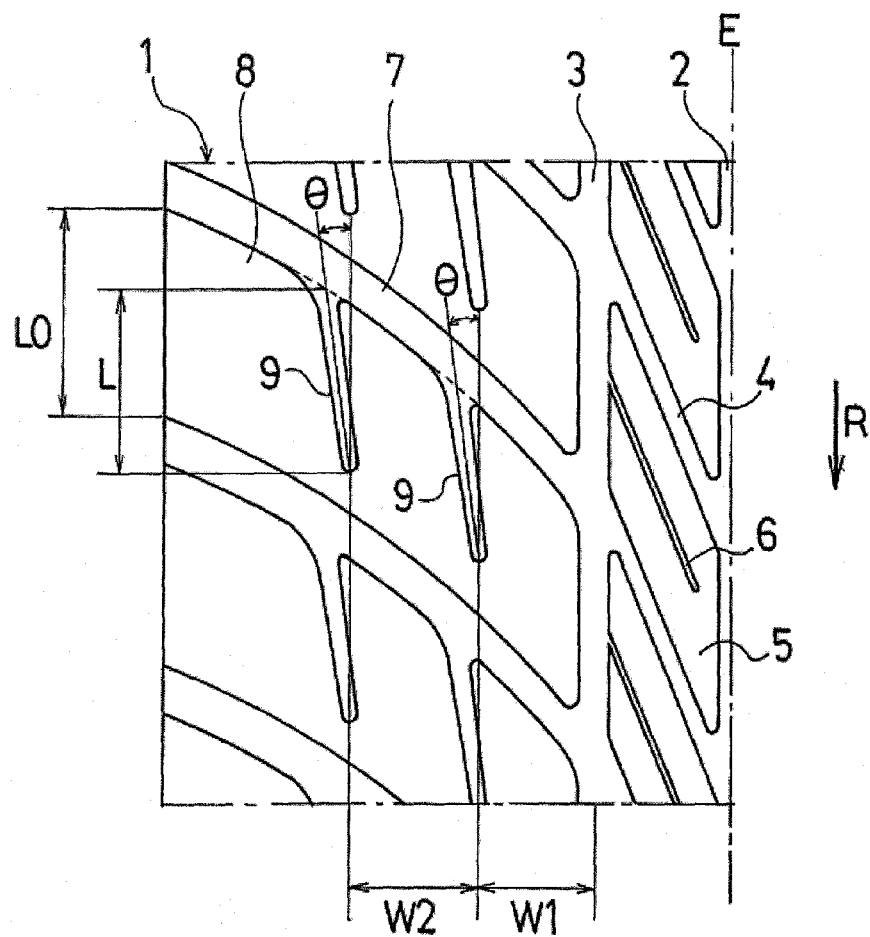
FIG. 2 is an enlarged plan view showing the main part of FIG. 1.
Figure 3:
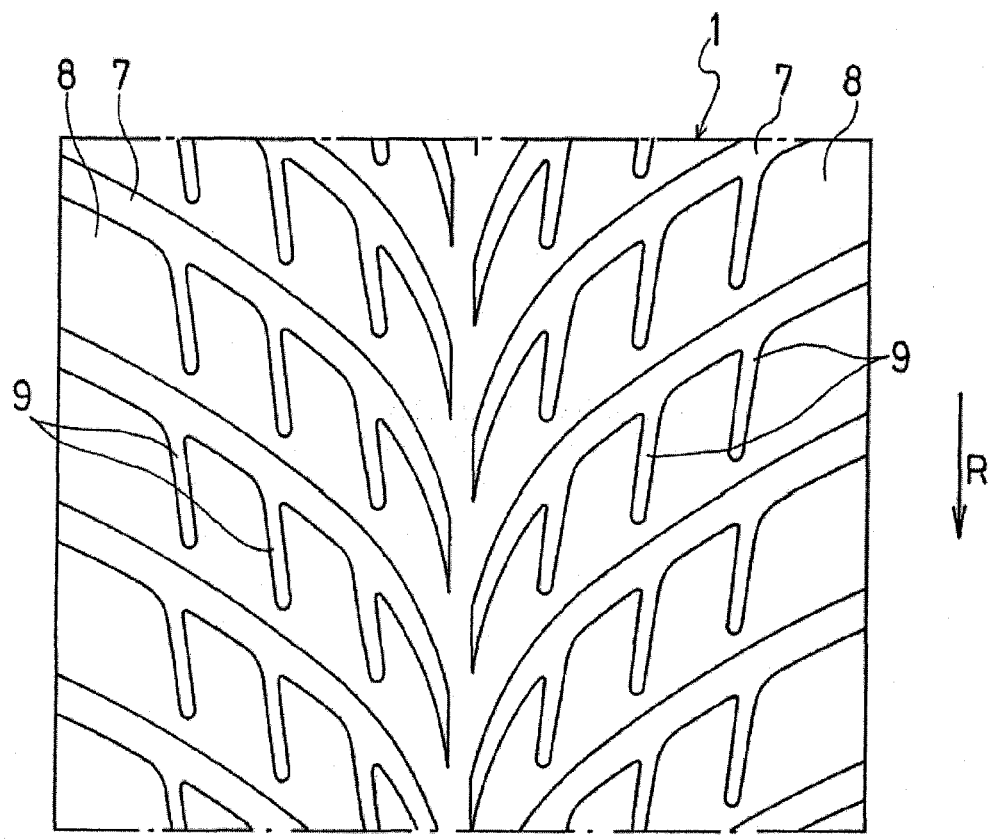
FIG. 3 is a development view showing the tread pattern of a pneumatic tire of a comparative example.
Figure 4:
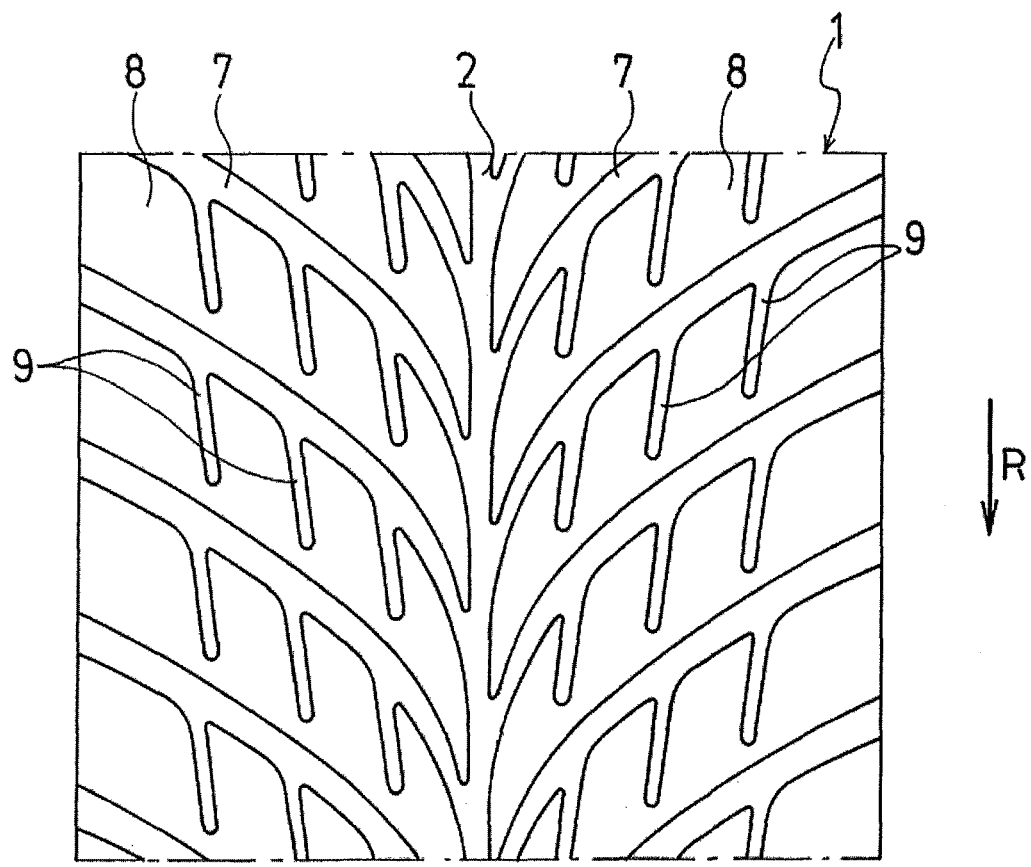
FIG. 4 is a development view showing the tread pattern of a pneumatic tire of another comparative example.
Figure 5:
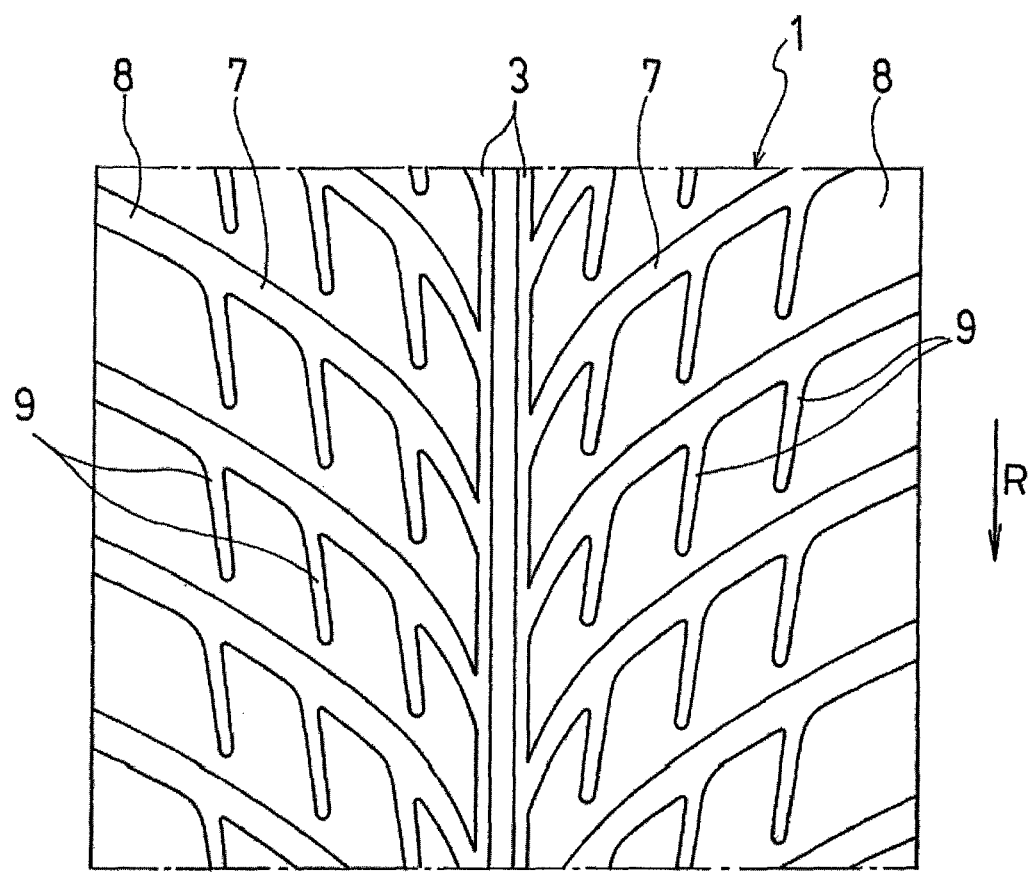
FIG. 5 is a development view showing the tread pattern of a pneumatic tire of another comparative example.
Figure 6:
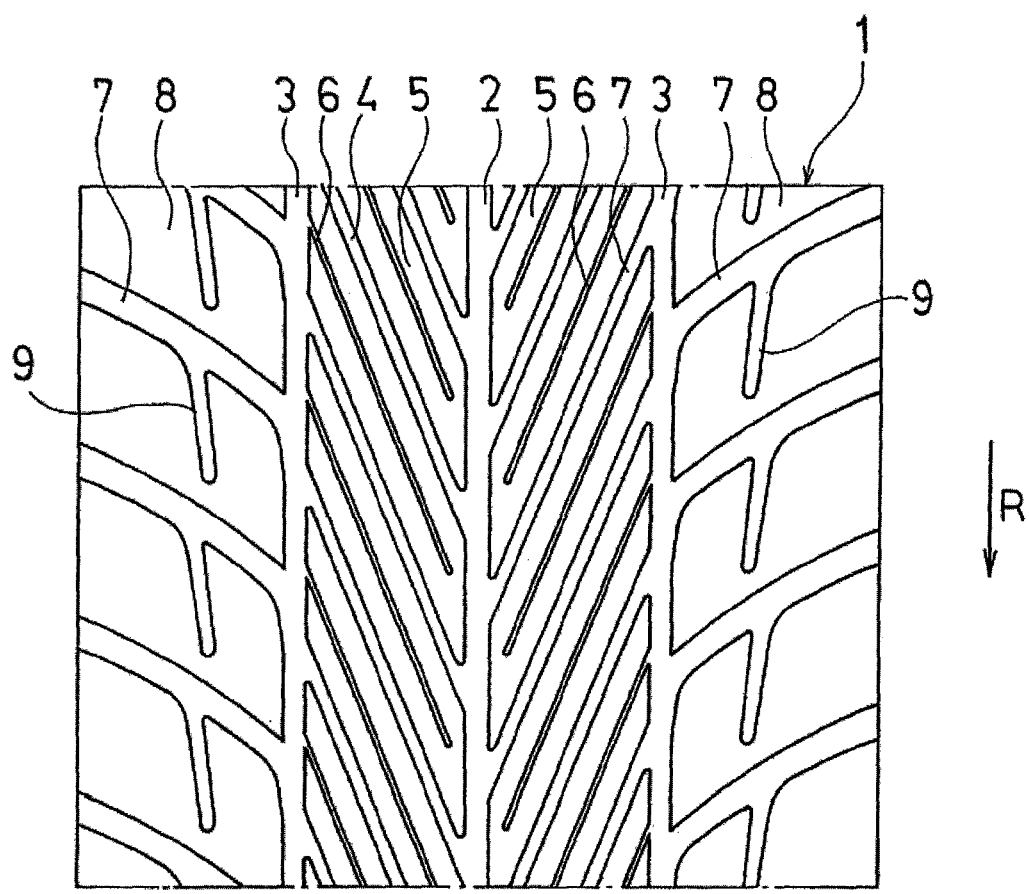
FIG. 6 is a development view showing the tread pattern of a pneumatic tire of another comparative example.

Detailed descriptions will be given below of a configuration of the present invention with reference to the accompanying drawings. FIG. 1 is a development view showing a tread pattern of a pneumatic tire according to an embodiment of the present invention, and FIG. 2 is an enlarged plan view showing the main part of FIG. 1. This pneumatic tire has a designated rotational direction R.

In FIG. 1, an entire area A having a width 85% of a total tire width and a center area Ac having a width 30% of the total tire width are defined in a tread portion 1. As shown in FIG. 1, in the center area Ac, a center main groove 2 that is positioned on a tire equatorial line E and that extends in a tire circumferential direction, and two subsidiary main grooves 3, positioned on each side of the center main groove 2 and extending in the tire circumferential direction are formed. With respect to the center main groove 2 and the subsidiary main grooves 3, a groove width thereof is from 5.0 mm to 12.0 mm and more preferably from 7.5 mm to 9.5 mm, and a groove depth thereof is preferably from 3.0 mm to 6.5 mm.

Between the center main groove 2 and each subsidiary main grooves 3, at intervals in the tire circumferential direction, is formed a plurality of angled grooves 4 that extend at an angle towards the outside in the tire width direction in a direction opposite the rotational direction R. The angled grooves 4 are in communication with both the center main groove 2 and the respective subsidiary main grooves 3. With respect to the angled grooves 4, a groove width thereof is from 2.0 mm to 8.0 mm and more preferably from 4.5 mm to 5.5 mm, and a groove depth thereof is preferably from 3.0 mm to 6.5 mm.

In each block 5 partitioned between angled grooves 4, a sipe 6 extending along the angled grooves 4 from the respective subsidiary main groove 3 is formed. The end on the tire equatorial line E side of the sipes 6 is closed. The sipes 6 preferably have a groove depth of 2 mm or less.

Also, in a region more towards each shoulder side than the respective subsidiary main groove 3, a plurality of lateral grooves 7 that extend at an angle towards the outside in the tire width direction in a direction opposite the rotational direction R, is formed. With respect to the lateral grooves 7, the end on the tire equatorial line E side is in communication with the respective subsidiary main groove 3 and the end on the outside in tire width direction opens to the tire side. Also, the lateral grooves 7 are curved so that an inclination angle to the tire circumferential side increases towards the outside in the tire width direction. With respect to the lateral grooves 7, a groove width thereof is from 5.0 mm to 11.0 mm and more preferably from 7.0 mm to 9.0 mm, and a groove depth thereof is preferably from 3.0 mm to 6.5 mm. Also, although the lateral grooves 7 are preferably arranged at an extension position of the angled grooves 4, positions in the tire circumferential direction of the angled grooves 4 and the lateral grooves 7 may deviate from each other.

In each block 8 partitioned between lateral grooves 7, a plurality of sub grooves 9 extending from the lateral grooves 7 towards the rotational direction R are formed. The end on a leading side of the sub grooves 9 is closed. With respect to the sub grooves 9, a groove width thereof is from 2.0 mm to 7.5 mm and more preferably from 3.0 mm to 6.5 mm, and a groove depth thereof is preferably from 3.0 mm to 6.5 mm.

In the above-mentioned pneumatic tire, the total length of a block edge in the center area Ac is set within a range from 40% to 60% and more preferably from 42% to 48% of the total length of a block edge in the entire area. Block edge means an edge of the tread surface of blocks 5 and 8 partitioned by the various grooves as disclosed above.

In the above-mentioned pneumatic tire, a central main groove 2 and subsidiary main grooves 3 extending in the tire circumferential direction are arranged in the center area Ac of the tread portion 1 while a plurality of angled grooves 4 and a plurality of lateral grooves 7 that extend at an angle towards the outside in the tire width direction are disposed in a direction opposite the rotational direction, along with a plurality of sub grooves 9 arranged extending from each lateral groove 7 towards the rotational direction. Water on road surfaces is drained in a tire lateral direction when traveling on wet road surfaces based on a drainage action of the angled grooves 4, the lateral grooves 7, and the sub grooves 9, thus making it possible to reduce the amount of water pushed back forward. Particularly, since the lateral grooves 7 are smoothly curved over their entire length, the flow of water in the lateral grooves is smooth, thus making it possible to direct such water in the tire lateral direction effectively. Therefore, it is possible to guarantee sufficient hydroplaning prevention performance when traveling straight. Also, in races with GT touring cars having tire housings, water remaining in the tire housing can be avoided.

Furthermore, by defining a ratio of a total length of the block edge in the center area Ac to a total length of the block edge in the entire area A of the tread portion 1, contact pressure to a road surface increases while guaranteeing block rigidity in the center area Ac, thus making it possible to improve running performance on wet road surfaces. When the total length of the block edge in the center area Ac is less than 40% of the total length of the block edge in the entire region A, running performance on wet road surfaces is insufficient, and when such exceeds 60%, it is difficult to achieve desired running performance on wet road surfaces due to deterioration of the block rigidity in the central region Ac.

Also, since the end on the leading side of the sub groove 9 formed in each block 8 between lateral grooves 7 is closed, the blocks 8 on the shoulder sides are not further divided by the sub grooves 9, so sufficient rigidity of the tread 1 can be assured, and it is possible to improve running performance on wet roads when traveling straight and when cornering beyond that which was conventionally possible.

As shown in FIG. 2, a length L in the tire circumferential direction of each sub groove 9 may be 50% or more and is preferably from 70% to 90% of a length L in the tire circumferential direction of each corresponding block 8. Drainage performance based on the sub grooves 9 can thus be improved. When the length L of the sub grooves 9 is less than 50% of the length of the blocks 8, improvement in drainage performance deteriorates, and when more than 90%, braking performance and cornering performance on wet road surfaces deteriorate, since there is significant deterioration in the rigidity of the tread portion.

Also, an inclination angle θ in the tire circumferential direction of each sub groove 9 should be 15° or less. Particularly, the sub grooves 9 preferably extend at an angle towards the outside in the tire width direction in a direction opposite the rotational direction R. Drainage performance based on the sub grooves can thus be improved thereby. The inclination angle θ of the sub grooves 9 is an inclination angle in the tire circumferential direction of a straight line connecting a terminal center position of the leading side with a terminal center position of a trailing side.

A distance W2 between the terminal center position of the leading side of adjacent sub grooves 9 in the tire width direction with respect to a distance W1 between the center position of the respective subsidiary main groove 3 and the terminal center position of the leading side of the sub groove 9 positioned most towards the tire equatorial line E side in the tire width direction preferably satisfies the relationship $0.85 \leq W2/W1 \leq 1.15$. By thus arranging the sub grooves 9 at approximately equal distances, water on road surfaces can be drawn into the sub grooves 9 effectively. For the same reason, a width of all the sub grooves 9 is preferably approximately equal in the part of each sub groove 9 opening into the lateral grooves 7. For example, using a width of the sub groove 9 positioned most towards the tire equatorial line E side as the standard, the change in a width of the other sub grooves 9 is within ±20% of the standard width.

In the above-mentioned pneumatic tire, a sipe 6 extending from the subsidiary main groove 3 along the angled grooves 4 is provided in each block 5 partitioned between angled grooves 4, but the sipes 6 contribute to increasing the total length of the block edge in the center area Ac. Also, since the end on the tire equatorial line E side of the sipes 6 is closed, it is possible to suppress deterioration of block rigidity in the center area Ac.

EXAMPLES

Tires having a designated rotational direction and different tread patterns were prepared for a conventional example, Examples 1 to 3, and Comparative Examples 1 to 4. The tire size was 280/710R18.

As shown in FIG. 1, the tires of Examples 1 to 3 are tires wherein, when an entire area having a width 85% of the total tire width and a center area having a width 30% of the total tire width are defined in the tread portion, one center main groove and two subsidiary main grooves extending in the tire circumferential direction are provided in the center area; a plurality of angled grooves that extend at an angle, in a direction opposite the rotational direction, towards the outside in the tire width direction are provided between the center main grooves and the subsidiary main grooves; sipes extending along the angled grooves from the respective subsidiary main grooves are provided in each block partitioned by the angled grooves and the end on the tire equatorial line side of the sipes is closed; a plurality of lateral grooves that extend at an angle, in a direction opposite the rotational direction, from each subsidiary main groove towards the outside in the tire width direction are provided; a plurality of sub grooves extending from the lateral grooves towards the rotational direction are provided in each block partitioned between these lateral grooves, the end on the leading side of these sub grooves being closed; and have different ratios (block edge ratio in center area) of the total length of the block edge in the center area to the total length of the block edge in the entire area.

The tires of Comparative Examples 1 to 4 have the tread patterns shown in FIGS. 3 to 6, the configurations being partially different to that of FIG. 1.

As shown in FIG. 7, the tire of the conventional example has, in a tread portion (11), a main groove (12) that is in the tread center position and that extends in the tire circumferential direction, a plurality of first angled grooves (13) that communicate with the main grooves and that extends at an angle, in a direction opposite the rotational direction, from the tread center position towards each shoulder side, and a plurality of second angled grooves (14) that is not in communication with the main groove and that extend at an angle, in the same direction as the respective first angled grooves, while intersecting six of the first angled grooves, wherein a plurality of blocks (15) are partitioned by the main groove and the multiple angled grooves, and a sipe (16) is provided in each block.

The running performance of these tires on a wet road surface was evaluated by the following evaluation methods, and the results thereof are shown in Table 1.

Running Performance on Wet Road Surfaces:

Test tires were mounted on a specific rim (18×11), which was mounted onto a racing car having an engine displacement of 3,500 cc, and then the tires were inflated to an air pressure of 190 kPa. Then test runs on a circuit having water scattered thereon were performed and the lap time was measured while a sensory evaluation was performed by the test driver. The lap time is shown as an index value with the conventional example as 100, using the inverse of the measured value. Larger index values indicate shorter the lap times. With respect to the sensory evaluation, running performance when traveling straight on a wet road surface, running performance when cornering on a wet road surface, and overall running performance on a wet road surface were evaluated. The evaluation results are represented as index values with the conventional example as 100. Larger index, values indicate superior running performances.

TABLE 1

|  |  | Conv.* Ex.** | Ex. 1 | Ex. 2 | Ex. 3 | Comp. Ex. 1*** | Comp. Ex. 2 | Comp. Ex. 3 | Comp. Ex. 4 |
|---|---|---|---|---|---|---|---|---|---|
| Tread Pattern | | FIG. 7 | FIG. 1 | FIG. 1 | FIG. 1 | FIG. 3 | FIG. 4 | FIG. 5 | FIG. 6 |
| Block Edge Ratio in Center Area (%) | | 35 | 40 | 45 | 50 | 30 | 33 | 35 | 35 |
| Running Performance on Wet Road Surfaces | Lap Time | 100 | 101.5 | 101.6 | 101.4 | 100.2 | 100.2 | 100.3 | 100.7 |
| | Overall Sensory Evaluation | 100 | 125 | 130 | 125 | 110 | 108 | 108 | 113 |
| | Traveling Straight Sensory Evaluation | 100 | 117 | 120 | 118 | 100 | 105 | 110 | 125 |
| | Cornering Sensory Evaluation | 100 | 138 | 140 | 137 | 120 | 110 | 105 | 100 |

*"Conv." as used in Table 1 is an abbreviation for "Conventional"
**"Ex." as used in Table 1 is an abbreviation for "Example"
***"Comp." as used in Table 1 is an abbreviation for "Comparative"

As is clear from Table 1, all of the tires of Examples 1 to 3 had superior running performances on wet road surfaces when traveling straight and when cornering compared to the conventional example. On the other hand, although there was improvement in running performance on wet road surfaces for Comparative Examples 1 to 3, running performance when traveling straight was particularly inferior since there are not many circumferential main grooves in the center area. Furthermore, although there was improvement in running performance on wet road surfaces for Comparative Example 4, running performance when cornering was particularly inferior since the subsidiary main grooves are in positions separated from the center area.

What is claimed is:

1. A pneumatic tire having a designated rotational direction, wherein-an entire area having a width 85% of a total tire width and a center area having a width 30% of the total tire width is defined in a tread portion, the pneumatic tire comprising:
    a center main groove that is positioned in the center area on a tire equatorial line and that extends in a tire circumferential direction, and subsidiary main grooves that are positioned in the center area on each side of the center main groove and extend in the tire circumferential direction;
    a plurality of angled grooves between the center main groove and each subsidiary main groove, wherein the plurality of angled grooves extend at an angle in a direction opposite the rotational direction and towards an outside in the tire width direction;
    a plurality of lateral grooves that extend at an angle, in a direction opposite the rotational direction, from each subsidiary main groove towards the outside in the tire width direction;
    blocks partitioned between the angled grooves and also partitioned between the lateral grooves; and
    a plurality of sub grooves in each block partitioned between the lateral grooves and extending from the lateral grooves towards the rotational direction;
    wherein an end of a leading side of the sub grooves is closed, and a total length of an edge on the tread surface of the blocks in the center area is from 40% to 60% of a total length of an edge on the tread surface of the blocks in the entire area.

2. The pneumatic tire according to claim 1, wherein the lateral grooves are curved so that an inclination angle to the tire circumferential direction increases towards the outside in the width direction.

3. The pneumatic tire according to claim 2, wherein a width of each sub groove is 3 mm or more and a length in the tire circumferential direction of each sub groove is 50% or more of a length in the tire circumferential direction of each corresponding block.

4. The pneumatic tire according to claim 2, wherein an inclination angle of each sub groove to the tire circumferential direction is 15° or less.

5. The pneumatic tire according to claim 2, wherein a distance W2 between a terminal center position of the leading side of adjacent sub grooves in the tire width direction with respect to a distance W1 between a center position of the subsidiary main grooves and a terminal center position of the leading side of the sub groove positioned nearest on the tire equatorial line side in the tire width direction satisfies a relationship $0.85 \leq W2/W1 \leq 1.15$.

6. The pneumatic tire according to claim 2, wherein sipes extending along the angled grooves from the subsidiary main grooves are provided in each block partitioned between the angled grooves, and an end on the tire equatorial line side of the sipes is closed.

7. The pneumatic tire according to claim 1, wherein a width of each sub groove is 3 mm or more and a length in the tire circumferential direction of each sub groove is 50% or more of a length in the tire circumferential direction of each corresponding block.

8. The pneumatic tire according to claim 7, wherein an inclination angle of each sub groove to the tire circumferential direction is 15° or less.

9. The pneumatic tire according to claim 7, wherein a distance W2 between a terminal center position of the leading side of adjacent sub grooves in the tire width direction with respect to a distance W1 between a center position of the subsidiary main grooves and a terminal center position of the leading side of the sub groove positioned nearest on the tire equatorial line side in the tire width direction satisfies a relationship $0.85 < W2/W1 < 1.15$.

10. The pneumatic tire according to claim 7, wherein sipes extending along the angled grooves from the subsidiary main grooves are provided in each block partitioned between the angled grooves, and an end on the tire equatorial line side of the sipes is closed.

11. The pneumatic tire according to claim 10, wherein a width of the sipes is 2 mm or less.

12. The pneumatic tire according to claim 1, wherein an inclination angle of each sub groove to the tire circumferential direction is 15° or less.

13. The pneumatic tire according to claim 12, wherein a distance W2 between a terminal center position of the leading side of adjacent sub grooves in the tire width direction with respect to a distance W1 between a center position of the subsidiary main grooves and a terminal center position of the leading side of the sub groove positioned nearest on the tire equatorial line side in the tire width direction satisfies a relationship $0.85 \leq W2/W1 \leq 1.15$.

14. The pneumatic tire according to claim 12, wherein sipes extending along the angled grooves from the subsidiary main grooves are provided in each block partitioned between the angled grooves, and an end on the tire equatorial line side of the sipes is closed.

15. The pneumatic tire according to claim 14, wherein a width of the sipes is 2 mm or less.

16. The pneumatic tire according to claim 1, wherein a distance W2 between a terminal center position of the leading side of adjacent sub grooves in the tire width direction with respect to a distance W1 between a center position of the subsidiary main grooves and a terminal center position of the leading side of the sub groove positioned nearest on the tire equatorial line side in the tire width direction satisfies a relationship $0.85 \leq W2/W1 \leq 1.15$.

17. The pneumatic tire according to claim 16, wherein sipes extending along the angled grooves from the subsidiary main grooves are provided in each block partitioned between the angled grooves, and an end on the tire equatorial line side of the sipes is closed.

18. The pneumatic tire according to claim 17, wherein a width of the sipes is 2 mm or less.

19. The pneumatic tire according to claim 1, wherein sipes extending along the angled grooves from the subsidiary main grooves are provided in each block partitioned between the angled grooves, and an end on the tire equatorial line side of the sipes is closed.

20. The pneumatic tire according to claim 19 wherein a width of the sipes is 2 mm or less.

\* \* \* \* \*